United States Patent
Alam et al.

(10) Patent No.: US 12,525,272 B2
(45) Date of Patent: Jan. 13, 2026

(54) SYSTEMS AND METHODS FOR SCAN CHAIN INTERFACE FOR NON-VOLATILE STORAGE BITS

(71) Applicant: Everspin Technologies, Inc., Chandler, AZ (US)

(72) Inventors: Syed M. Alam, Austin, TX (US); Jacob T. Williams, Austin, TX (US)

(73) Assignee: Everspin Technologies, Inc., Chandler, AZ (US)

( * ) Notice: Subject to any disclaimer, the term of this patent is extended or adjusted under 35 U.S.C. 154(b) by 209 days.

(21) Appl. No.: 18/478,643

(22) Filed: Sep. 29, 2023

(65) Prior Publication Data

US 2024/0112713 A1 Apr. 4, 2024

Related U.S. Application Data

(60) Provisional application No. 63/378,201, filed on Oct. 3, 2022.

(51) Int. Cl.
*G01R 31/3185* (2006.01)
*G11C 11/16* (2006.01)
*H03K 3/037* (2006.01)
*H03K 19/20* (2006.01)

(52) U.S. Cl.
CPC .. *G11C 11/1675* (2013.01); *G01R 31/318525* (2013.01); *G01R 31/318536* (2013.01); *G01R 31/318552* (2013.01); *G11C 11/1673* (2013.01); *G11C 11/1693* (2013.01); *H03K 3/037* (2013.01); *H03K 19/20* (2013.01)

(58) Field of Classification Search
CPC ............ G11C 11/1675; G11C 11/1673; G11C 11/1693; G01R 31/318525; G01R 31/318536; G01R 31/318552; H03K 3/037; H03K 19/20

USPC ........................................................ 365/158
See application file for complete search history.

(56) References Cited

U.S. PATENT DOCUMENTS

| 9,973,194 B2 | 5/2018 | Tate et al. |
| 10,411,711 B2 | 9/2019 | Kozaczuk et al. |
| 2008/0192554 A1* | 8/2008 | Hashimoto ...... G11C 29/50004 365/201 |

(Continued)

FOREIGN PATENT DOCUMENTS

| CN | 106059567 A | 10/2016 |
| CN | 110532222 A | 12/2019 |

OTHER PUBLICATIONS

Chen Yong-Xiao et al: "Testing of Non-volatile Logic-Based System Chips", Asian Test Symposium Proceedings, IEEE, Nov. 16, 2014, pp. 224-229.

(Continued)

*Primary Examiner* — Ly D Pham
(74) *Attorney, Agent, or Firm* — Bookoff McAndrews PLLC

(57) ABSTRACT

A scan chain circuitry for a memory device includes a first non-volatile storage bit (nvbit) configured to receive a shared control signal, a second nvbit configured to receive the shared control signal, a first flip-flop connected to the first nvbit, and a second flip-flop connected to the second nvbit and the first flip-flop. The first flip-flop enables loading a first data in (din) to the first nvbit based on a clock signal, and the second flip-flop enables loading a second din to the second nvbit based on the clock signal.

9 Claims, 7 Drawing Sheets

(56) References Cited

U.S. PATENT DOCUMENTS

2012/0321032 A1   12/2012  Liu et al.
2014/0047293 A1*  2/2014  Lamb ............. G01R 31/318555
                                                            714/E11.054
2017/0115342 A1    4/2017  Wang
2018/0238965 A1*  8/2018  Anzou .................. G11C 11/418

OTHER PUBLICATIONS

Extended European Search Report issued in EP Application No. 23201404.3, dated Jul. 11, 2024, pp. 1-12.

* cited by examiner

SYSTEMS AND METHODS FOR SCAN CHAIN INTERFACE FOR NON-VOLATILE STORAGE BITS

CROSS-REFERENCE TO RELATED APPLICATION

This application claims benefit to U.S. Provisional Patent Application No. 63/378,201, filed Oct. 3, 2022, the entire contents of which are incorporated herein by reference.

TECHNICAL FIELD

Various embodiments of the present disclosure relate generally to storage devices and, more particularly, to scan chain circuitry including non-volatile distributed storage bits using a shared control signal for execution of one or more operations.

INTRODUCTION

In general, a memory system may include a memory device for storing data and a host (or controller) for controlling operations of the memory device. Memory devices may be classified into volatile memory (such as, e.g., dynamic random-access memory (DRAM), static random-access memory (SRAM), etc.) and non-volatile memory (such as, e.g., electrically erasable programmable read-only memory (EEPROM), ferroelectric random-access memory (FRAM), phase-change memory (PRAM), magnetoresistive random-access memory (MRAM), resistive random-access memory (RRAM/ReRAM), flash memory, etc.).

Storage bits in non-volatile memories, when distributed in a distributed manner (e.g., non-volatile distributed storage bits), may provide a number of benefits for usage in field programmable gate array (FPGA) configuration storages, neural network weights/bias storages, physically unclonable function (PUF) implementations, and the like. Memory operations (e.g., read, write, etc.) performed in such architectures may require propagation of various control signals (e.g., read control signal, write control signal, etc.) to the distributed storage bits via corresponding read/write circuitries. Specifically, each non-volatile distributed storage bit may need individual routing of control signals for operation. As the number of non-volatile distributed storage bits that need to be implemented increases, routing individual control signals to each storage bit may become challenging.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
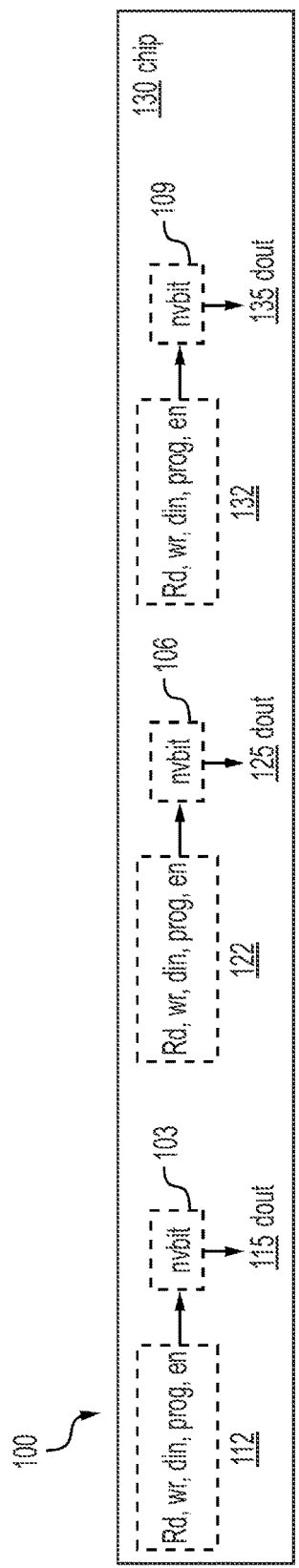
FIG. 1 depicts an exemplary block diagram of a plurality of non-volatile distributed storage bits (nvbits) implemented in a memory device, according to one or more embodiments.

Detailed illustrative aspects are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of exemplary embodiments described herein.

When the specification makes reference to "one embodiment" or to "an embodiment," it is intended to mean that a particular feature, structure, characteristic, or function described in connection with the embodiment being discussed is included in at least one contemplated embodiment of the present disclosure. Thus, the appearance of the phrases, "in one embodiment" or "in an embodiment," in different places in the specification does not constitute a plurality of references to a single embodiment of the present disclosure.

As used herein, the singular forms "a," "an," and "the" are intended to include the plural forms as well, unless the context clearly indicates otherwise. It also should be noted that in some alternative implementations, the features and/or steps described may occur out of the order depicted in the figures or discussed herein. For example, two steps or figures shown in succession may instead be executed substantially concurrently or may sometimes be executed in the reverse order, depending upon the functionality/acts involved. In some aspects, one or more described features or steps may be omitted altogether, or may be performed with an intermediate step therebetween, without departing from the scope of the embodiments described herein, depending upon the functionality/acts involved.

Further, the terms "first," "second," and the like, herein do not denote any order, quantity, or importance, but rather are used to distinguish one element from another. Similarly, terms of relative orientation, such as "top," "bottom," etc. are used with reference to the orientation of the structure illustrated in the figures being described. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

Non-volatile distributed storage bits (nvbits) may be used in various applications due to a number of benefits they provide. For example, nvbits using magnetoresistive random-access memory (MRAM) technology (e.g., magnetic tunnel junctions (MTJs) may be used in various applications such as field-programmable gate array (FPGA) configuration storages, neural network weights/bias storages, physically unclonable function (PUF) implementations, among others. Implementation of nvbits in such architectures may become difficult as the number of nvbits that need to be implemented increases because each nvbit for a chip or memory device may need individual control signals for execution of various operations such as read, write, and one-time program (OTP). For example, control signal routing challenges may arise when there are hundreds or thousands of nvbits that may need to be interfaced in a chip.

To mitigate the control signal routing challenges discussed above, one or more embodiments of the present disclosure may include a scan chain serial interface that enables distribution of one or more shared control signals amongst a plurality of nvbits that may be grouped together in a chip. Distribution of the one or more shared control signals may be achieved using various logic circuitries such as flip-flops and latches, which may facilitate execution of various read or write operations for the plurality of nvbits based on different phases of a clock signal.

According to one or more embodiments, a plurality of scan chain circuitries may be used to implement a scan-chain serial interface for nvbits for a memory device. An exemplary scan chain circuitry may include a plurality of nvbits and a plurality of logic circuitries connected to the plurality of nvbits. The plurality of nvibts may share a control signal (e.g., read, write, program enable, etc.), and the plurality of logic circuitries may share a clock signal. Based on different phases of a clock signal and operations indicated by the control signal, the scan chain circuitry may enable, among other operations, loading a data in (din) to an nvbit and reading out a data out (dout) of an nvbit, which correspond to a write operation and a read operation for the nvbit, respectively. Each scan chain circuitry including nvbits and corresponding logic circuitries (e.g., flip flops) as part of a scan chain serial interface may be referred to as a "group" (e.g., Group 1, Group 2, Group 3, etc.). Each group may share a respective control signal and a respective clock signal, to execute various operations supported by the control signal. The logic circuitries in a group may be connected to each other based on a signal chain that connects a serial output and/or a serial input between the logic circuitries.

Referring now to the drawings, FIG. 1 depicts an exemplary block diagram 100 of a plurality of nvbits implemented in a distributed manner in a memory device (e.g., a chip) 130, according to one or more embodiments. The memory device 130 may be a standalone memory device chip, or any other type of chip such as a microprocessor, FPGA, artificial intelligence (AI), or application-specific integrated circuit (ASIC) chip. The nvbits may comprise non-volatile memory such as MRAM, FRAM, EEPROM, or the like. In one embodiment, the plurality of nvbits include a first nvbit 103, a second nvbit 106, and a third nvbit 109. Although three nvbits are illustrated in FIG. 1, the number of nvbits implemented in the memory device 130 is not limited to three and may be less than or more than three.

The first nvbit 103 is configured to receive a first control signal 112, the second nvbit 106 is configured to receive a second control signal 122, and the third nvbit 109 is configured to receive a third control signal 132. Each control signal may be different from each other and may be used to execute various operations for a respective nvbit such as a read operation, write operation, data in (din) operation, program operation, enable operation, and other operations.

For example, bit data (e.g., logic 0 or logic 1) may be written to the first nvbit 103, the second nvbit 106, and/or the third nvbit 109 based on receipt of a control signal indicating a write operation. In the above example, the first control signal 112, the second control signal 122, and/or the third control signal 132 may each indicate a write operation for the first nvbit 103, the second nvbit 106, and the third nvbit 109, respectively. In other cases, data may be read from the first nvbit 103, the second nvbit 106, and/or the third nvbit 109 based on receipt of a respective control signal indicating a read operation. Data read from the first nvbit 103, the second nvbit 106, and/or the third nvbit 109 may correspond to data out (dout) 115, dout 125, and/or dout 135. Each of the nvbits 103, 106, and 109 may be operated independently from each other. Although not explicitly shown in FIG. 1, a logic circuitry may be connected to each of the nvbits 103, 106, and 109 to facilitate the operations indicated by the control signals 112, 122, and 132.

Figure 2:
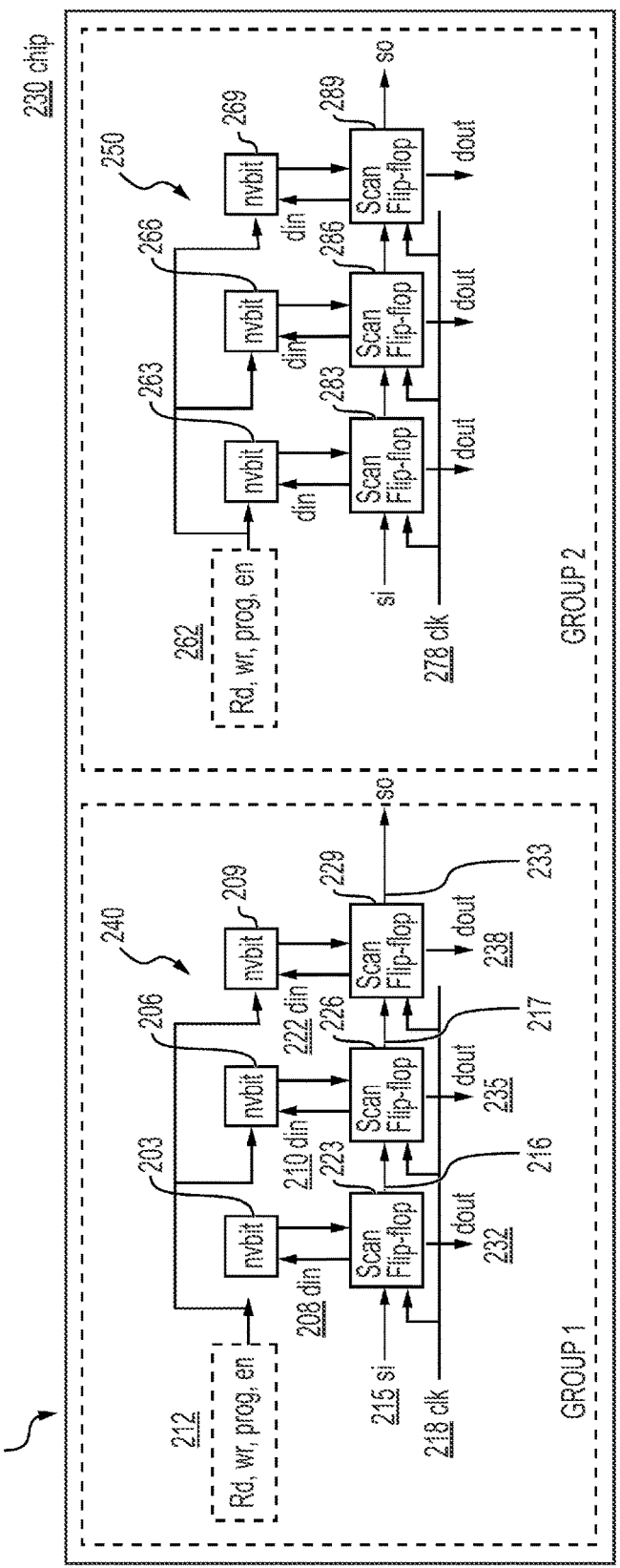
FIG. 2 depicts an exemplary block diagram of a plurality of nvbits implemented in a scan chain circuitry for a memory device, according to one or more embodiments.

FIG. 2 depicts an exemplary block diagram 200 of a plurality of nvbits implemented in a scan chain circuitry for a memory device, according to one or more embodiments. A first plurality of nvbits may be implemented in a first scan chain circuitry 240, and a second plurality of nvbits may be implemented in a second scan chain circuitry 250. As depicted, the first scan chain circuitry 240 may be referred to as "Group 1," and the second scan chain circuitry 250 may be referred to as "Group 2." The plurality of nvbits may be accessed in the memory device 230 for read operations, write operations, program operations, and other operations. The nvbits in the memory device 230 may include non-volatile memory such as MRAM, FRAM, EEPROM, or the like.

The first scan chain circuitry 240 may include a first nvbit 203, a second nvbit 206, and a third nvbit 209. However, the first scan chain circuitry 240 is not limited thereto and may include more nvbits as needed depending on application and/or other factors. The first nvbit 203, the second nvbit 206, and the third nvbit 209 may be connected to a first flip-flop 223, a second flip-flop 226, and a third flip-flop 229, respectively. Each of the nvbits 203, 206, and 209 may share a control signal 212, which may support read operations, write operations, program operations, and enable operations. Each of the flip-flops 223, 226, and 229 may share a clock signal 218. Based on the control signal 212 and the clock signal 218, each of the nvbits 203, 206, and 209 may be operated simultaneously. That is, each of the nvbits 203, 206, and 209 may simultaneously support a read operation, a write operation, a program operation, or an enable operation.

For a write operation to the first nvbit 203, the first nvbit 203 may receive a control signal 212 that indicates a write operation. The first flip-flop 223 may receive a first serial input 215 at a first phase of the clock signal 218, and the first flip-flop 223 may load a first din 208 to the first nvbit 203. For a write operation to the second nvbit 206, the second nvbit 206 may receive the control signal 212 that indicates a write operation. The second flip-flop 226 may receive a second serial input 216 from the first flip-flop 223 at a second phase of the clock signal 218, and the second flip-flop 226 may load a second din 210 to the second nvbit 206. For a write operation to the third nvbit 209, the third flip-flop 229 may receive a third serial input 217 from the second flip-flop 226 at a third phase of the clock signal 218, and the third flip-flop 229 may load a third din 222 to the third nvbit 209. The third flip-flop 229 may provide a serial output 233, which may be a test output. The first flip-flop 223, the second flip-flop 226, and the third flip-flop 229 may enable serially loading din to the first nvbit 203, the second nvbit 206, and the third nvbit 209, respectively.

For a read operation of the first nvbit 203, the first nvbit 203 may receive a control signal 212 that indicates a read operation. At a first phase of the clock signal 218, the first nvbit 203 may provide a first dout 232 to the first flip-flop 223. For a read operation from the first nvbit 203, the second nvbit 206 may receive the control signal 212 that indicates a read operation. At a second phase of the clock signal 218, the second nvbit 206 may provide a second dout 235 to the second flip-flop 226. For a read operation from the third nvbit 209, the third nvbit 209 may receive the control signal 212 that indicates a read operation. At a third phase of the clock signal 218, the third nvbit 209 may provide a third dout 238 to the third flip-flop 229. The third flip-flop 229 may provide a serial output 233 which may be a test output. The first flip-flop 223, the second flip-flop 226, and the third flip-flop 229 may provide the first dout 232, the second dout 235, and the third dout 238, respectively, to one or more connectable devices configured to read from the first nvbit 203, the second nvbit 206, and/or the third nvbit 209.

According to an alternate method of operation, a read operation of the first nvbit 203, the second nvbit 206, and the third nvbit 209 may occur simultaneously or around the same time upon receiving control signal 212. The flip-flops 223, 226, 229 (e.g., scan flip-flops) may load the read outputs from the nvbits 203, 206, and 209 to all of the flip-flops 223, 226, 229 using a phase of the clock signal 218 or any other input signal not shown in FIG. 2. This method allows loading all the read outputs from nvbits 203, 206, 209 in parallel to produce dout signals 232, 235, and 238. Furthermore, the scan chain formed with the flip-flops 223, 226, 229 can then be serially scanned out through the serial output ("so") 233 with multiple phases of the clock signal 218 to produce dout signals at the test output.

The flip-flops 223, 226, and 229 may include D flip-flops, SR flip-flops, JK flip-flops, master-slave flip-flops, or other types of flip-flops not explicitly named. The first scan chain circuitry 240 is merely illustrated as a representative example in FIG. 2, to explain the concepts of the embodiments described herein. It should be noted that the description for the first scan chain circuitry 240 explicitly provided in the present disclosure is not exhaustive, and the first scan chain circuitry 240 may include other components that are not shown in FIG. 2. Furthermore, one or more components of the first scan chain circuitry 240 illustrated in FIG. 2 may be omitted.

The second scan chain circuitry 250 is similar to the first scan chain circuitry 240 and may share similar components. For example, the second scan chain circuitry 250 may include a first nvbit 263, a second nvbit 266, and a third nvbit 269. The second scan chain circuitry 250 is not limited thereto and may include more nvbits as needed depending on application and/or other factors. The first nvbit 263, the second nvbit 266, and the third nvbit 269 may be connected to a first flip-flop 283, a second flip-flop 286, and a third flip-flop 289, respectively. Each of the nvbits 263, 266, and 269 may share a control signal 262, which may support read operations, write operations, program operations, and enable operations. Each of the flip-flops 283, 286, and 289 may share a clock signal 278. Based on the control signal 262 and the clock signal 278, each of the nvbits 263, 266, and 269 may be operated simultaneously. That is, each of the nvbits 263, 266, and 269 may simultaneously support a read operation, a write operation, a program operation, and/or an enable operation.

Similar to how the first scan chain circuitry 240 may execute read and/or write operations for the nvbits 203, 206, and 209, the second scan chain circuitry 250 may execute read and/or write operations for the nvbits 263, 266, and 269, using similar components. Accordingly, certain portions of the description corresponding to the read and/or write operations are omitted for brevity. The second scan chain circuitry 250 may operate independently of the first scan chain circuitry. Although 2 groups of scan chain circuitries are depicted in FIG. 2, the memory device 230 may include additional scan chain circuitries (e.g., Group 3, Group 4, etc.), or the memory device 230 may include a single scan chain circuitry.

Figure 3:
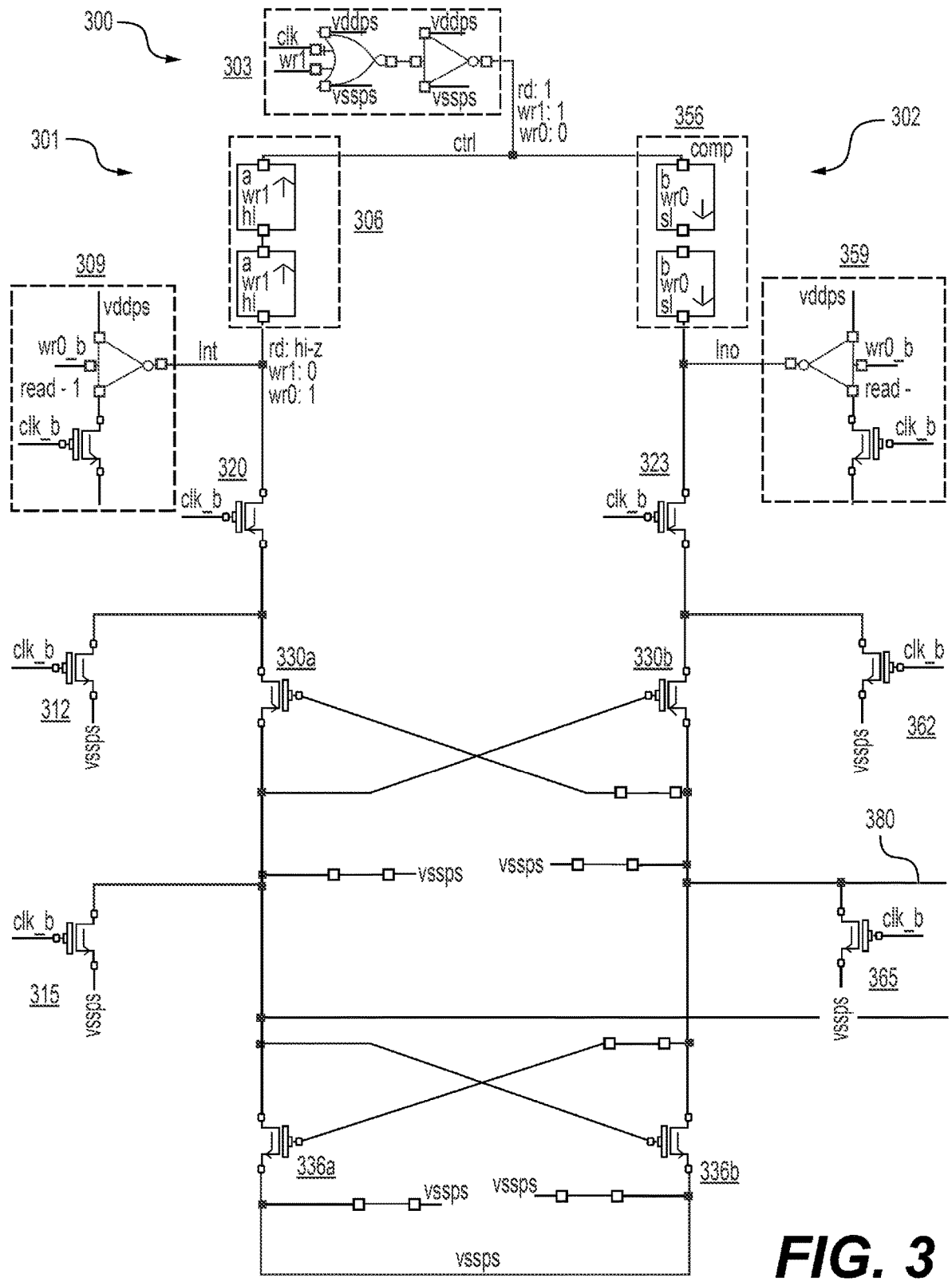
FIG. 3 depicts an exemplary circuit schematic of a bitcell for implementing an nvbit in a memory device, according to one or more embodiments.

FIG. 3 depicts a circuit schematic of a bitcell 300 for implementing an nvbit in a memory device, according to one or more embodiments. For example, the bitcell 300 may be used to implement an nvbit discussed with respect to the first scan chain circuitry 240 or the second scan chain circuitry 250 shown in FIG. 2. The bitcell 300 may employ symmetric circuitry between a left leg 301 and a right leg 302. The left leg 301 may include one or more first magnetic tunnel junctions (MTJs) 306, one or more first write circuitries 309 connected to the one or more first MTJs 306, a first read circuitry 312 connected to the one or more first MTJs 306, and a second read circuitry 315 connected to the one or more first MTJs 306.

The right leg 302 may include similar components to those of the left leg 301. For example, the right leg 302 may include one or more second MTJs 356, one or more second write circuitries 359 connected to the one or more second MTJs 356, a third read circuitry 362 connected to the one or more second MTJs 356, and a fourth read circuitry 365 connected to the one or more second MTJs 356. Logic circuitry 303 may be connected to both of the one or more first MTJs 306 and the one or more second MTJs 356. The logic circuitry 303 may include various logic circuits such as an inverter gate and a NOR gate.

Each of the one or more first write circuitries 309 and the one or more second write circuitries 359 may be embodied as an inverter logic gate and a transistor. The transistor may include metal-oxide-semiconductor field-effect transistors (MOSFETs) such as N-channel (NMOS) MOSFETs, P-channel (PMOS) MOSFETs, floating-gate MOSFETS, or other types of MOSFETs. Each of the first read circuitry 312, the second read circuitry 315, the third read circuitry 362, and the fourth read circuitry 365 may include a transistor, similar to the MOSFETs described above for the one or more first write circuitries 309 and the one or more second write circuitries 359. The one or more first write circuitries 309 and the one or more second write circuitries 359 may be connected to a positive power supply "vddps." The read circuitries 312, 315, 362, and 365 may be connected to ground power supply "vssps."

The one or more first MTJs 306 and the one or more second MTJs 356 may be used to read or write data (e.g., bit data) using the respective read or write circuitries described above. The one or more first MTJs 306 and the one or more second MTJs 356 may be physically provided on a backend layer between a first metal layer and a second metal layer of a memory stack. As depicted, each of the one or more first MTJs 306 and the one or more second MTJs 356 includes two MTJs. However, greater than two MTJs may be implemented in the one or more first MTJs 306 and the one or more second MTJs 356 depending on application and/or other factors.

For a write operation to the one or more first MTJs 306 and the one or more second MTJs 356, a write control signal ("wrl") and a clock signal ("clk") may be transmitted to the logic circuitry 303, and a voltage may be transmitted from the logic circuitry 303 to the one or more first MTJs 306 and the one or more second MTJs 356. Additionally, a clock signal ("clk_b") may be transmitted to each transistor of the one or more first write circuitries 309 and the one or more second write circuitries 359, and a write control signal ("wr0_b") may be transmitted to each inverter of the one or more first write circuitries 309 and the one or more second write circuitries 359. It should be noted that the clock signal clk_b may be an inversion of clock signal clk whereas the write control signals wr0_b and wr1_b are inversions of write control signals wr0 and wr1, respectively. Based on the clock signal clk_b and the write control signal wr0_b, the one or more first MTJs 306 may store a first logic state (e.g., logical 0 or 1) and the one or more second MTJs 356 may store a second logic state, opposite of the first logic state, to store bit data.

To start the execution of a read operation, one or more electrical nets connected to the one or more first write circuitries 309 and/or the one or more second write circuitries 359 may need to be grounded. Additionally, some or all of the components of the bitcell 300 may be grounded when idle, and internal nets may be grounded before a read operation can occur. The clock signal clk (at potentially a different phase compared to the clock signal clk transmitted for execution of a write operation) and a read control signal ("rd") may be transmitted to the logic circuitry 303 instead of a write control signal wr1. Voltage may then be applied via the logic circuitry 303 to the one or more first MTJs 306 and the one or more second MTJs 356. The clock signal clk_b may be transmitted to each transistor of the first read circuitry 312, the second read circuitry 315, the third read circuitry 362, and the fourth read circuitry 365, at potentially a different phase compared to the clock signal clk_b transmitted for execution of a write operation.

The above-mentioned read circuitries 312, 315, 362, and 365 may be used, in combination with other read circuitry such as cross-coupled transistor pairs 330a, 330b, 336a, and 336b, to determine a resistance difference between the first leg 301 and the second leg 302 as part of a differential read scheme, to read information or bit data stored by way of the one or more first MTJs 306 and the one or more second MTJs 356. A logic state (e.g., 0 or 1) may be determined based on the resistance difference between the one or more first MTJs 306 and the one or more second MTJs 356. The above-mentioned read circuitries 312, 315, 362, and 365 may produce an output signal dout 380 corresponding to the information or value read from the one or more first MTJs 306 and/or the one or more second MTJs 356. The information or value read from the one or more first MTJs 306 and/or the one or more second MTJs 356 may correspond to a first logic state and a complimentary logic state (e.g., opposite logic state of the first logic state), respectively.

The bitcell 300 may include a first pair of cross-coupled transistors 330a and 330b and a second pair of cross-coupled transistors 336a and 336b. The first pair of cross-coupled transistors 330a and 330b and the second pair of cross-coupled transistors 336a and 336b may include NMOS or PMOS transistors. The first pair of cross-coupled transistors 330a and 330b and the second pair of cross-coupled transistors 336a and 336b may be components of the above-mentioned read circuitries 312, 315, 362, and 365. The first pair of cross-coupled transistors 330a and 330b and the second pair of cross-coupled transistors 336a and 336b may provide positive feedback of voltage between the left leg 301 and the right leg 302 for the execution of a read operation. When there is a voltage difference between the two legs due to resistance differences between the one or more first MTJs 306 and the one or more second MTJs 356, one or more signals generated by the first pair of cross-coupled transistors 330a and 330b and the second pair of cross-coupled transistors 336a and 336b may amplify the voltage difference between the left leg 301 and the right leg 302, resulting in the generation time of the output signal dout 380 being reduced.

The bitcell 300 may further include a left switching transistor 320 located at the left leg 301 and a right switching transistor 323 located at the right leg 302. The left switching transistor 320 and the right switching transistor 323 may assist in switching operations of current flowing in the left leg 301 and the right leg 302, respectively.

Figure 4:
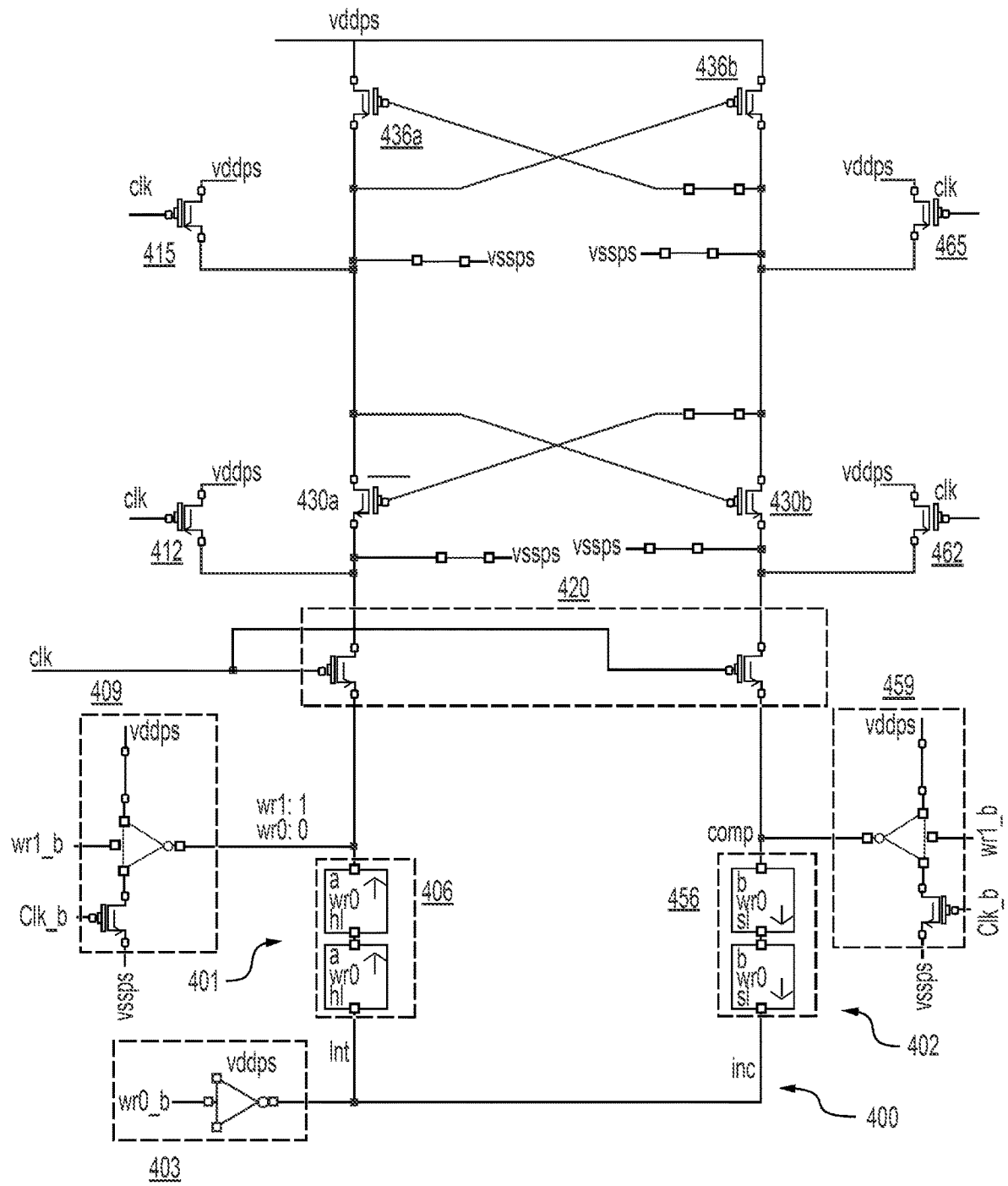
FIG. 4 depicts an exemplary circuit schematic of a bitcell for implementing an nvbit in a memory device using a pair of follower transistors, according to one or more embodiments.

FIG. 4 depicts a circuit schematic of a bitcell 400 for implementing an nvbit in a memory device using a pair of follower transistors 420, according to one or more embodiments. For example, the bitcell 400 may be used to implement an nvbit discussed with respect to the first scan chain circuitry 240 or the second scan chain circuitry 250 shown in FIG. 2. Similar to the components of the bitcell 300 (FIG. 3), the bitcell 400 may employ symmetric circuitry between a left leg 401 and a right leg 402. The left leg 401 may include one or more first magnetic tunnel junctions (MTJs) 406, one or more first write circuitries 409 connected to the one or more first MTJs 406, a first read circuitry 412 connected to the one or more first MTJs 406, and a second read circuitry 415 connected to the one or more first MTJs 406.

The right leg 402 may include similar components to those of the left leg 401. For example, the right leg 402 may include one or more second MTJs 456, one or more second write circuitries 459 connected to the one or more second MTJs 456, a third read circuitry 462 connected to the one or more second MTJs 456, and a fourth read circuitry 465 connected to the one or more second MTJs 456. Logic circuitry 403 may be connected to both of the one or more first MTJs 406 and the one or more second MTJs 456. The logic circuitry 403 may include various logic circuits such as an inverter gate and may be configured to receive a write control signal "wr0_b."

Each of the one or more first write circuitries 409 and the one or more second write circuitries 459 may include an inverter logic gate and one or more transistors. The one or more transistors may include various types of MOSFETs, such as NMOS, PMOS, floating-gate MOSFETS, or other types of MOSFETs. Each of the first read circuitry 412, the second read circuitry 415, the third read circuitry 462, and the fourth read circuitry 465 may include a transistor, similar to the MOSFETs described above for the one or more first write circuitries 409 and the one or more second write circuitries 459. The read circuitries 412, 415, 462, and 465 may be connected to positive power supply vddps and also to a ground power supply "vssps." The read circuitries 412, 415, 462, and 465 may operate based on a clock signal "clk."

The one or more first MTJs 406 and the one or more second MTJs 456 may be used to read or write data (e.g., bit data) using the respective read or write circuitries described above. The one or more first MTJs 406 and the one or more second MTJs 456 may be physically provided on a backend layer between a first metal layer and a second metal layer of a memory stack. As depicted, each of the one or more first MTJs 406 and the one or more second MTJs 456 includes two MTJs. However, each of the one or more first MTJs 406 and the one or more second MTJs 456 may include more than two MTJs depending on application and/or other factors. Further, in another embodiment, each of the one or more first MTJs 406 and the one or more second MTJs 456 may include a single MTJ. A write operation and a read operation may be executed similarly to those described for the bitcell 300 (FIG. 3) except as otherwise stated herein.

The one or more first write circuitries 409 and the one or more second write circuitries 459 may be configured to perform write operations based on a clock signal "clk_b" and a write control signal "wr1_b." For example, if a logic 1 is written to the one or more first MTJs 406, a logic 0 may be written to the one or more second MTJs 456, and vice versa. The one or more first MTJs 406 and the one or more second MTJs 456 may be configured to store complimentary (e.g., opposite) logical states from each other.

The bitcell 400 may include a first pair of cross-coupled transistors 430a and 430b and a second pair of cross-coupled transistors 436a and 436b. The first pair of cross-coupled transistors 430a and 430b and the second pair of cross-coupled transistors 436a and 436b may be similar to the first pair of cross-coupled transistors 330a and 330b and the second pair of cross-coupled transistors 336a and 336b described with respect to FIG. 3. For example, the first pair of cross-coupled transistors 430a and 430b and the second pair of cross-coupled transistors 436a and 436b may provide positive feedback of voltage between the left leg 401 and the right leg 402 for the execution of a read operation. When there is a voltage difference between the two legs due to resistance differences between the one or more first MTJs 406 and the one or more second MTJs 456 (e.g., due to stored complimentary logic states), one or more signals generated by the first pair of cross-coupled transistors 430a and 430b and the second pair of cross-coupled transistors 436a and 436b may amplify the voltage difference between the left leg 401 and the right leg 402, resulting in the generation time of an output signal dout (not shown) being reduced. Additionally, the second pair of cross-coupled transistors 436a and 436b may be connected to a positive power supply "vddps."

The bitcell 400 may include a pair of follower transistors 420. The pair of follower transistors 420 may isolate the one or more first MTJs 406 and the one or more second MTJs 456 from the read circuitries (e.g., first read circuitry 412, second read circuitry 415, third read circuitry 462, fourth read circuitry 465, first pair of cross-coupled transistors 430a and 430b, and second pair of cross-coupled transistors 436a and 436b) described above. According to one example, the pair of follower transistors 420 may include NMOS follower transistors, but other types of follower transistors may also be used. The pair of follower transistors 420 may operate based on a transmitted clock signal clk, which may also control operations of the logic circuitry 403. The pair of follower transistors 420 may help control voltage levels across the one or more first MTJs 406 and the one or more second MTJs 456 for a read operation. For example, an NMOS follower source voltage flowing to the one or more first MTJs 406 and/or the one or more second MTJs 456 from the pair of follower transistors 420 may be based on a gate voltage and a threshold voltage for the pair of follower transistors 420. In one case, the NMOS follower source voltage flowing to the one or more first MTJs 406 may be determined by subtracting a threshold voltage from a gate voltage of a left leg transistor of the pair of follower transistors 420 (e.g., transistor located at the left leg 401 of the pair of follower transistors 420). The NMOS follower source voltage flowing to the one or more second MTJs 456 may be determined using a similar approach.

Figure 5:
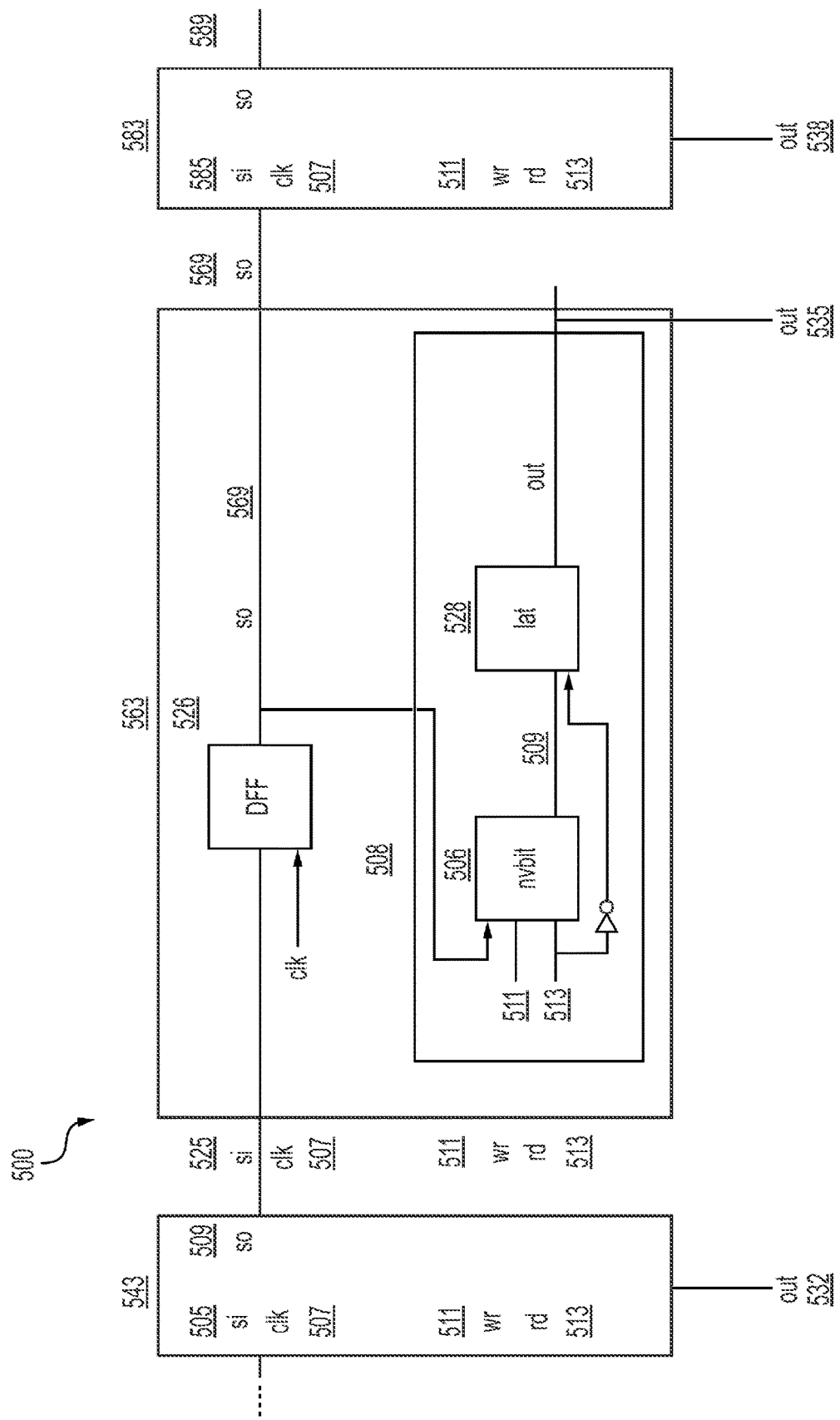
FIG. 5 depicts an exemplary block diagram of a scan chain circuitry implemented with one or more nvbits, according to one or more embodiments.

FIG. 5 depicts an exemplary block diagram of a scan chain circuitry implemented with one or more nvbits, according to one or more embodiments. Scan chain circuitry 500 may include a first partition 543, a second partition 563, and a third partition 583, each with at least one nvbit that is implemented. For example, the second partition 563 includes an nvbit 506 that may be connected to a flip-flop 526 and a latch 528 as shown. The circuit schematics illustrated in FIGS. 3 and 4 may correspond to each partition illustrated in FIG. 5. Further, each "group" illustrated in FIG. 2 may correspond to the scan chain circuitry illustrated in FIG. 5.

For a write operation to the nvbit 506, the flip-flop 526 may receive a serial input 525 at a first phase of a clock signal ("clk") 507, and may write or load a din 508 to the nvbit 506 as an input. For example, the din 508 may include either a logic 0 or 1 (e.g., a bit). For the write operation, the nvbit 506 may receive a write control signal 511 (e.g., the write signal 511 may be switched on). The write control signal 511 may be a shared global signal or a unique signal associated with the nvbit 506. Based on the value of the din 508, states of one or more MTJs (e.g., see FIGS. 3 and 4) associated with the implementation of the nvbit 506 may be set.

For a read operation from the nvbit 506, the nvbit 506 may receive a read control signal 513 (e.g., the read signal 513 may be switched on). Information or bit data may be read from the nvbit 506 and transmitted in an output signal 535 to the latch 528. For example, read circuitries (e.g., see FIGS. 3 and 4) connected to the one or more MTJs associated with the implementation of the nvbit 506 may generate the output signal 535, which may be stored in the latch 528.

The first partition 543 and the third partition 583 may contain similar components to that of the second partition 563. That is, the first partition 543 and the third partition 583 each may contain at least one nvbit, one flip-flop, and one latch. Each nvbit of each partition 543, 563, and 583 may share the write control signal 511 and the read control signal 513. Each flip-flop of each partition 543, 563, and 583 may share the clock signal 507. The first partition may be configured to generate a first output signal 532, and the third partition 583 may be configured to generate a third output signal 538. The flip-flop of the first partition 543 may receive a serial input 505 from a flip-flop of a preceding partition that may be included in the scan chain circuitry 500. The flip-flop of the first partition 543 may also generate a serial output 509 which may be fed into the flip-flop 526 as a serial input 525. The flip-flop 526 may generate a serial output 569, which may be fed into the flip-flop of the third partition 583 as a serial input 585. The flip-flop of the third partition 583 may generate a serial output 589, which may be fed into a flip-flop of a fourth partition as a serial input, or may be provided to a different circuitry within a memory device. In some cases, the serial output 589 may be a test output. The scan chain circuitry 500 may contain as many partitions as necessary depending on application and/or other factors.

Figure 6:
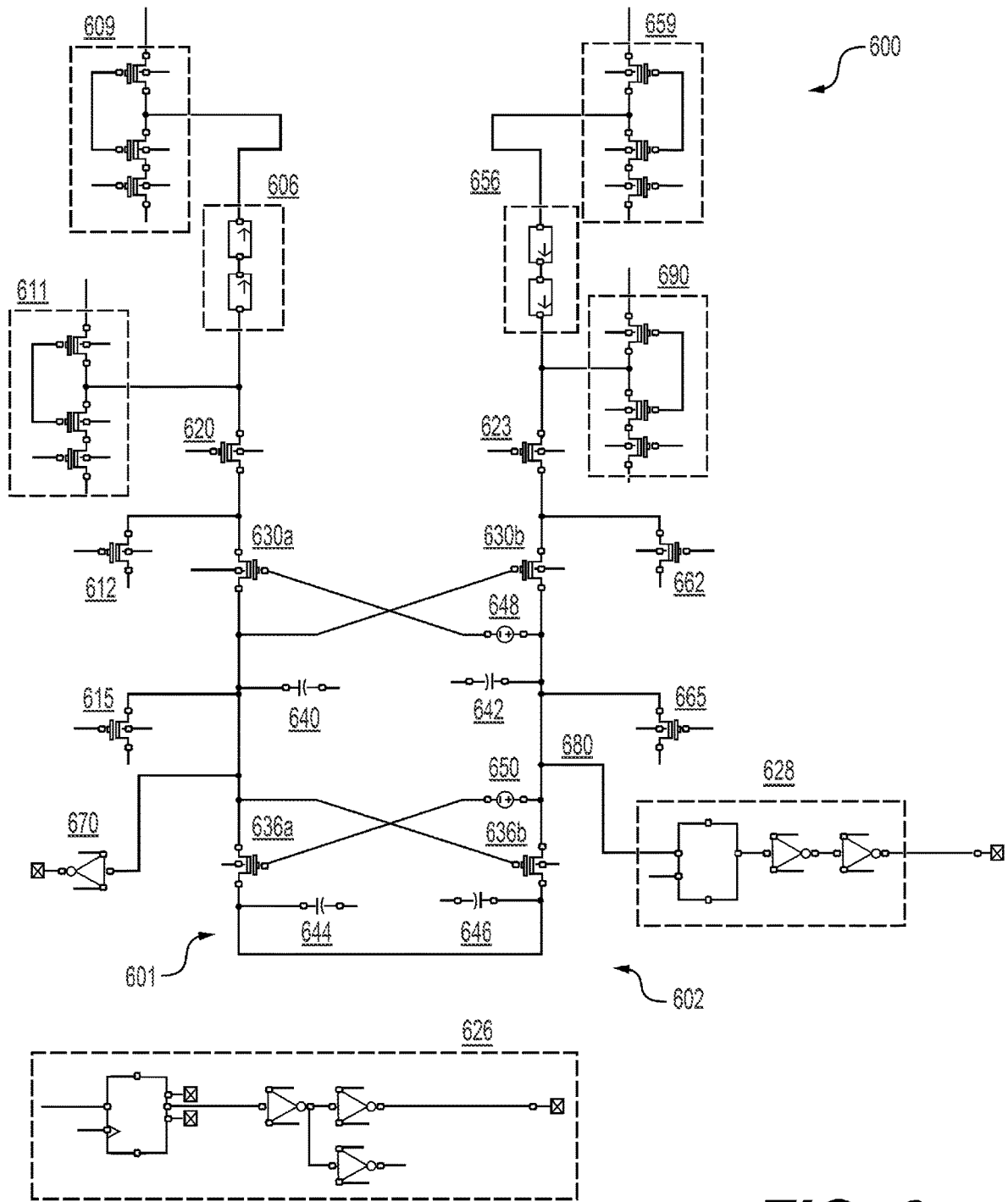
FIG. 6 depicts an exemplary circuit schematic of a bitcell for implementing an nvbit in a memory device using a scan chain circuitry, according to one or more embodiments.

FIG. 6 depicts a circuit schematic of a bitcell 600 for implementing an nvbit in a memory device using a scan chain circuitry, according to one or more embodiments. For example, the bitcell 600 may be used to implement an nvbit discussed with respect to the first scan chain circuitry 240 (FIG. 2), the second scan chain circuitry 250 (FIG. 2), or the scan chain circuitry 500 (FIG. 5). Similar to the components of the bitcell 300 (FIG. 3) or the bitcell 400 (FIG. 4), the bitcell 600 may employ symmetric circuitry between a left leg 601 and a right leg 602. The left leg 601 may include one or more first magnetic tunnel junctions (MTJs) 606, one or more first write circuitries 609 connected to the one or more first MTJs 606, one or more second write circuitries 611 connected to the one or more first MTJs 606, a first read circuitry 612 connected to the one or more first MTJs 606, a second read circuitry 615 connected to the one or more first MTJs 606, and a third read circuitry 670 connected to the one or more first MTJs 606. The third read circuitry 670 may include an inverter gate.

Similarly, the right leg 602 may include similar components to those of the left leg 601. For example, the right leg 602 may include one or more second MTJs 656, one or more first write circuitries 659 connected to the one or more second MTJs 656, one or more second write circuitries 690 connected to the one or more second MTJs 656, a fourth read circuitry 662 connected to the one or more second MTJs 656, and a fifth read circuitry 665 connected to the one or more second MTJs 656.

Each of the one or more first write circuitries (e.g., one or more first write circuitries 609 and one or more first write circuitries 659) and the one or more second write circuitries (e.g., one or more second write circuitries 611 and one or more second write circuitries 690) of the left leg 601 and the right leg 602 may include one or more transistors. The one or more transistors may include various types of MOSFETS, such as NMOS, PMOS, floating-gate MOSFETS, and other types of MOSFETs. Each of the first read circuitry 612, the second read circuitry 615, the fourth read circuitry 662, and the fifth read circuitry 665 may comprise a transistor, similar to the MOSFETs described above for the one or more first write circuitries (e.g., one or more first write circuitries 609 and one or more first write circuitries 659) and the one or more second write circuitries (e.g., one or more second write circuitries 611 and one or more second write circuitries 690).

The one or more first MTJs 606 and the one or more second MTJs 656 may be used to store data (e.g., bit data) using the respective read or write circuitries described above. The one or more first MTJs 606 and the one or more second MTJs 656 may be physically provided on a backend layer between a first metal layer and a second metal layer of a memory stack. As depicted, each of the one or more first MTJs 606 and the one or more second MTJs 656 includes two MTJs. However, each of the one or more first MTJs 606 and the one or more second MTJs 656 may include more than two MTJs, or may include a single MTJ. A write operation and a read operation may be executed similarly to those described for the bitcell 300 (FIG. 3), using similar clock signals, write control signals, and/or read control signals.

The bitcell 600 may further include a left switching transistor 620 located at the left leg 601 and a right switching transistor 623 located at the right leg 602. The left switching transistor 620 and the right switching transistor 623 may assist in switching operations of current flowing in the left leg 601 and the right leg 602, respectively.

Additionally, the one or more first MTJs 606 and the one or more second MTJs 656 may be connected to a flip-flop (e.g., D flip-flop) 626 for a write operation. The flip-flop 626 may be similar to the flip-flop 526 (FIG. 5) as part of a scan chain circuitry and can include a plurality of inverter gates as depicted. Similar to the operation of the flip-flop 526, the flip-flop 626 may be configured to load or write a din to the one or more first MTJs 606 and the one or more second MTJs 656 based on a clock signal and one or more input control signals. For example, if a logic 1 is written to the one or more first MTJs 606, a logic 0 may be written to the one or more second MTJs 656, and vice versa. The one or more first MTJs 606 and the one or more second MTJs 656 may be configured to store complimentary (e.g., opposite) logical states from each other.

The bitcell 600 may include a first pair of cross-coupled transistors 630a and 630b and a second pair of cross-coupled transistors 636a and 636b. The first pair of cross-coupled transistors 630a and 630b and the second pair of cross-coupled transistors 636a and 636b may be similar to the pairs of cross-coupled transistors depicted and described in FIGS. 3 and 4. For example, the first pair of cross-coupled transistors 630a and 630b and the second pair of cross-coupled transistors 636a and 636b may provide positive feedback of voltage between the left leg 601 and the right leg 602 for the execution of a read operation. When there is a voltage difference between the two legs due to resistance differences between the one or more first MTJs 606 and the one or more second MTJs 656 (e.g., due to stored complimentary logic states, etc.), one or more signals generated by the first pair of cross-coupled transistors 630a and 630b and the second pair of cross-coupled transistors 636a and 636b may amplify the voltage difference between the left leg 601 and the right leg 602, resulting in an output signal dout 680 being generated more quickly.

The first pair of cross-coupled transistors 630a and 630b may be connected to a first voltage source 648. The second pair of cross-coupled transistors 636a and 636b may be connected to a second voltage source 650. The first pair of cross-coupled transistors 630a and 630b may be connected to a first capacitor 640 and second capacitor 642. The second pair of cross-coupled transistors 636a and 636b may additionally be connected to third capacitor 644 and fourth capacitor 646. It should be noted that the voltage sources 648 and 650 and the capacitors 640, 642, 644, and 646 are present for robustness simulation of the design. Some or all of these elements, particularly the voltage sources 648 and 650, may be omitted in practice (e.g., in a silicon implementation) although shown in the present disclosure.

For a read operation, the read circuitries described above (e.g., first read circuitry 612, second read circuitry 615, third read circuitry 670, fourth read circuitry 662, and fifth read circuitry 665) may generate the output signal dout 680, which may be transmitted to an output latch 628. The output latch 628 may be similar to the latch 528 and may be configured to store the output signal dout 680, which may correspond to the information read from the one or more first MTJs 606 and/or the one or more second MTJs 656. The output signal dout 680 may be determined based on a resistance difference between the one or more first MTJs 606 and the one or more second MTJs 656 resulting from the stored complimentary logic states.

Figure 7:
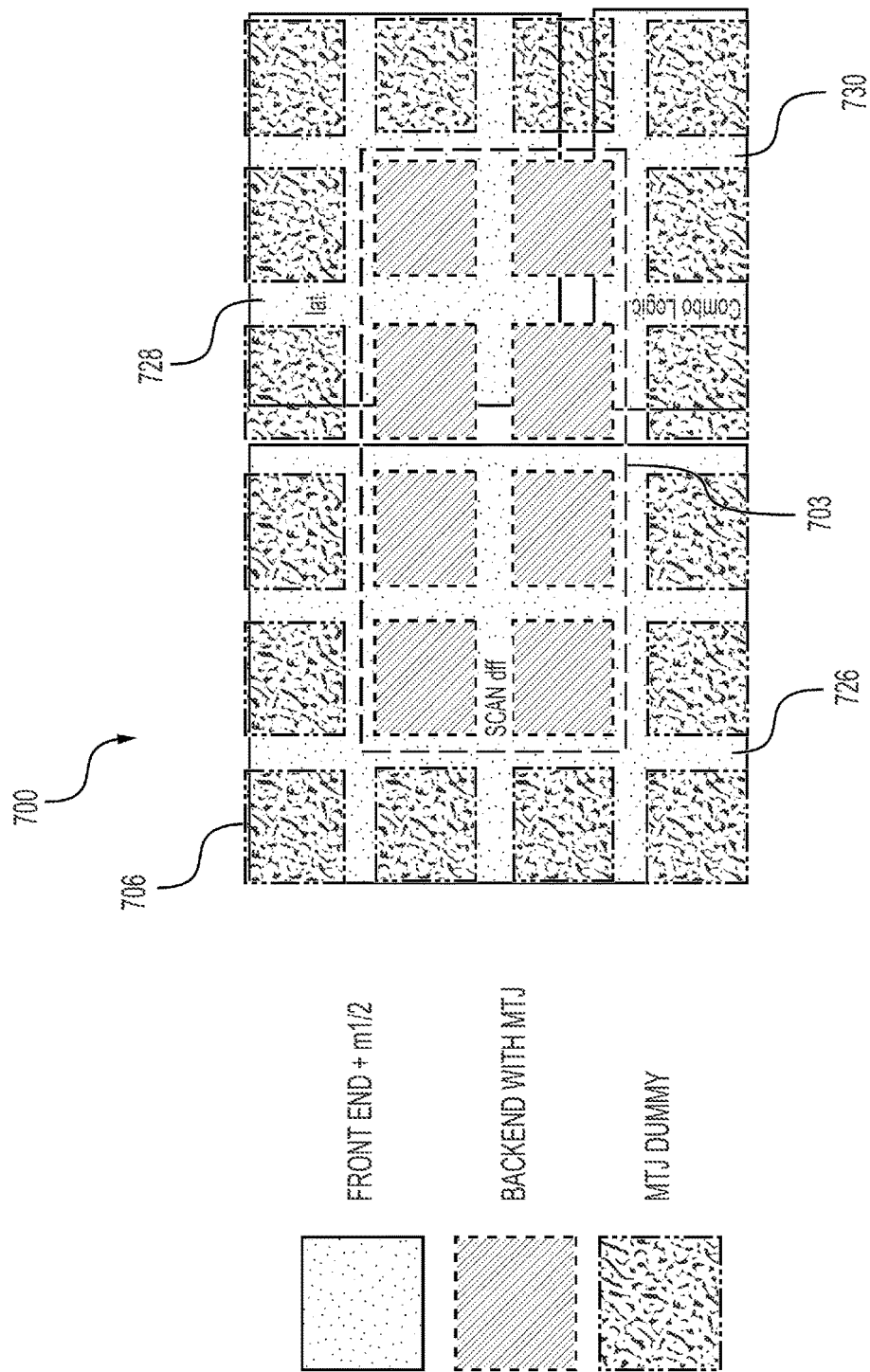
FIG. 7 depicts an exemplary layout of a memory device for implementing an nvbit bitcell with dummy magnetic tunnel junctions (MTJs), according to one or more embodiments.

FIG. 7 depicts an exemplary layout of a memory device 700 for implementing an nvbit bitcell with dummy MTJs, according to one or more embodiments. FIG. 7 provides a bird's eye view of a memory stack including bitcell components (of one nvbit bitcell) and dummy MTJs. The memory device 700 includes a bitcell, which may include a flip-flop 726, a latch 728, and combination logic circuitry 730, all of which may be provided on a first metal layer or a second metal layer of a memory stack (e.g., MRAM stack) of the memory device 700. The bitcell may also include one or more MTJs 703, provided on a backend metal layer of the memory stack, between the first metal layer and the second metal layer. The bitcell of the memory device 700 may correspond to the bitcell 300 (FIG. 3), the bitcell 400 (FIG. 4), and the bitcell 600 (FIG. 6). The flip-flop 726 and the latch 728 may operate similarly to the flip-flop 526 (FIG. 5) and the latch 528 (FIG. 5), respectively. In one example, the one or more MTJs 703 may be provided in a layer of the overall stack above the layer where the flip-flop 726, the latch 728, and the combination logic circuitry 730 are located. In an inverted position, the one or more MTJs 703 may be provided in a layer of the overall stack below the layer where the flip-flop 726, the latch 728, and the combination logic circuitry 730 are located.

A plurality of dummy MTJs 706 may be provided proximate to the one or more MTJs 703 on the backend layer. The plurality of dummy MTJs 706 may be provided on the backend layer and along an outer boundary footprint of the flip-flop 726, the latch 728, and the combination logic circuitry 730. The plurality of dummy MTJs 706 may have a combined area footprint that is equal to or greater than a combined area footprint of the one or more MTJs 703. The plurality of dummy MTJs 706 may be positioned around the one or more MTJs 703 on the backend layer. As such, the plurality of dummy MTJs 706 may have a combined perimeter footprint that is greater than a combined perimeter footprint of the one or more MTJs 706. The combined perimeter footprint of the plurality of dummy MTJs 706 may be outside (e.g., along the circumference of) the combined perimeter footprint of the one or more MTJs 706. Further, the area occupied by the flip-flop 726, the latch 728, and the combination logic circuitry 730 on a metal layer may be substantially equal to the area occupied by the one or more MTJs 703 and the plurality of dummy MTJs 706 on a backend layer. The plurality of dummy MTJs 706 may provide operational stability to the memory device 700 and/or may help assess the quality and consistency of the fabrication process of the memory device 700 in various cases.

Figure 8:
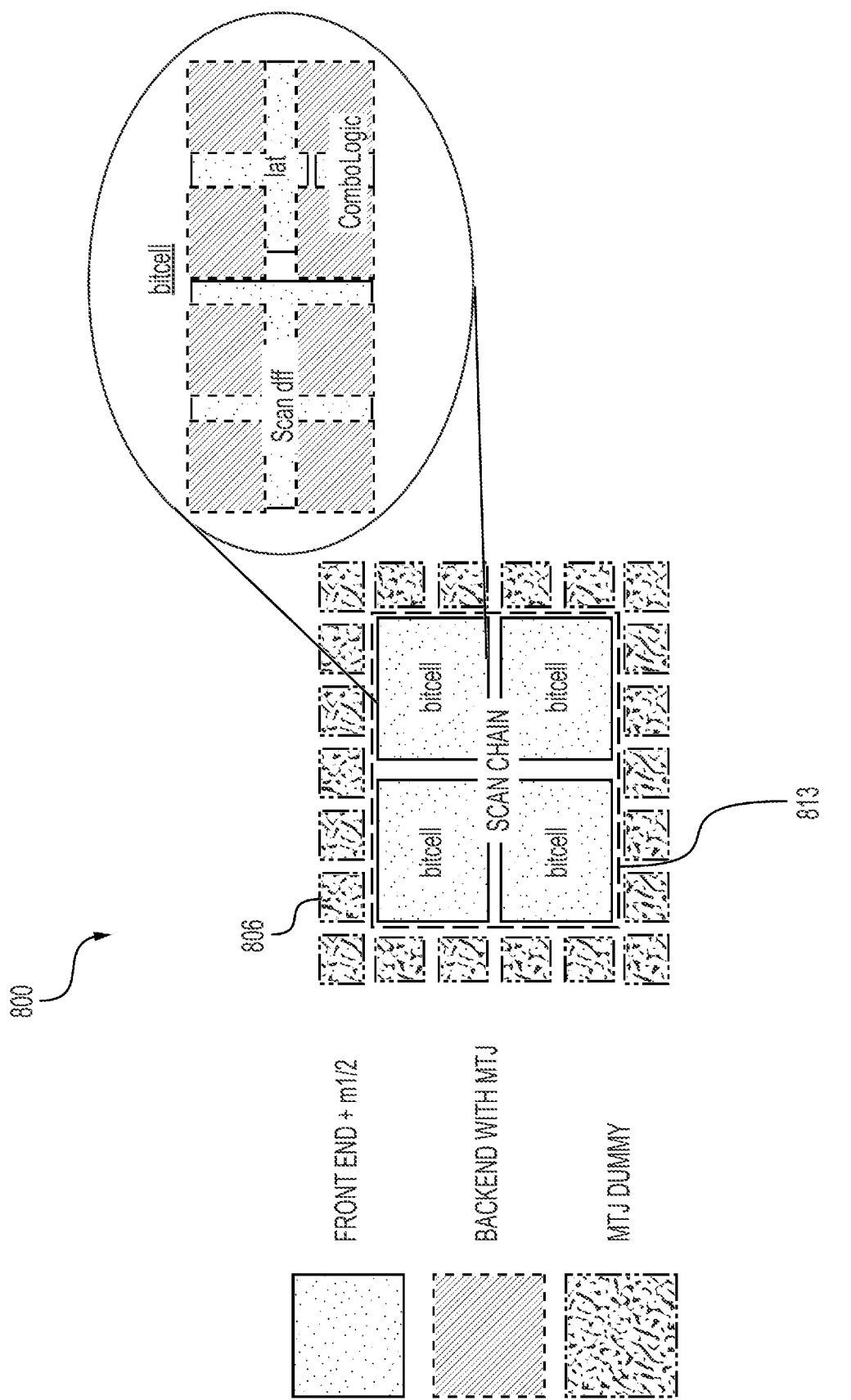
FIG. 8 depicts an exemplary layout of a memory device for implementing a plurality of nvbit bitcells with dummy MTJs, according to one or more embodiments.

FIG. 8 depicts an exemplary layout of a memory device 800 for implementing a plurality of nvbit bitcells with dummy MTJs, according to one or more embodiments. FIG. 7 provides a bird's eye view of a memory stack including bitcell components (of a plurality of nvbit bitcells) and dummy MTJs. The memory device 800 includes one or more bitcells 813, each of which may correspond to the bitcell of the memory device 700 described with respect to FIG. 7. As such, each bitcell of the one or more bitcells 813 may correspond to the bitcell 300 (FIG. 3), the bitcell 400 (FIG. 4), and the bitcell 600 (FIG. 6). A flip-flop, a latch, and combination logic circuitry of each of the one or more bitcells 813 may be provided on a first metal layer or a second metal layer of a memory stack. Each of the one or more bitcells 813 also includes one or more MTJs, which are provided on a backend metal layer of a memory stack of the memory device 800 between a first metal layer and a second metal layer. The memory device 800 also includes a plurality of dummy MTJs 806 provided on the backend layer of the memory stack, e.g., on the same layer where the one or more MTJs are located. As depicted, when viewed from the top, the plurality of dummy MTJs 806 may be provided on a backend layer around the MTJs belonging to the plurality of bitcells 813, rather than around MTJs of a single bitcell, which was described above in reference to FIG. 7. When viewed from the top, the plurality of dummy MTJs 806 are positioned around the periphery of the plurality of bitcells 813, on a backend layer which may be located between metal layers.

The plurality of dummy MTJs 806 may have a combined area footprint that is equal to or greater than a combined area footprint of the plurality of bitcells 813. The plurality of dummy MTJs 806 may have a combined perimeter footprint that is greater than a combined perimeter footprint of the one or more bitcells 813. The combined perimeter footprint of the plurality of dummy MTJs 806 may be outside the combined perimeter footprint of the one or more bitcells 813. The plurality of dummy MTJs 806 may provide operational stability to the memory device 800 and/or may help assess the quality and consistency of the fabrication process of the memory device 800 in various cases.

In some aspects, the techniques described herein relate to a scan chain circuitry for a memory device, including: a first non-volatile storage bit (nvbit) configured to receive a shared control signal; a second nvbit configured to receive the shared control signal; a first flip-flop connected to the first nvbit; and a second flip-flop connected to the second nvbit and the first flip-flop, wherein the first flip-flop enables loading a first data in (din) to the first nvbit based on a clock signal, and wherein the second flip-flop enables loading a second din to the second nvbit based on the clock signal.

In some aspects, the techniques described herein relate to a scan chain circuitry, wherein loading the first din to the first nvbit and loading the second din to the second nvbit are configured to occur simultaneously.

In some aspects, the techniques described herein relate to a scan chain circuitry, wherein the first flip-flop enables providing a first data out (dout) from the first nvbit based on the clock signal, and wherein the second flip-flop enables providing a second dout from the second nvbit based on the clock signal.

In some aspects, the techniques described herein relate to a scan chain circuitry, wherein for execution of a write operation to the first nvbit: the first flip-flop is configured to load the first din to the first nvbit based on the clock signal; and the first nvbit is configured to receive a write signal as the shared control signal, wherein a logic state of the first nvbit is set based on the first din.

In some aspects, the techniques described herein relate to a scan chain circuitry, wherein for execution of a write operation for the second nvbit: the second flip-flop is configured to load the second din to the second nvbit based on the clock signal; and the second nvbit is configured to receive the write signal as the shared control signal, wherein a logic state of the second nvbit is set based on the second din.

In some aspects, the techniques described herein relate to a scan chain circuitry, further including: a first output latch connected to the first nvbit; and a second output latch connected to the second nvbit.

In some aspects, the techniques described herein relate to a scan chain circuitry, wherein for execution of a read operation for the first nvbit: the first nvbit is configured to receive a read signal as the shared control signal; and the first output latch is configured to receive a first output signal from the first nvbit.

In some aspects, the techniques described herein relate to a scan chain circuitry, wherein for execution of a read operation for the second nvbit: the second nvbit is configured to receive the read signal as the shared control signal; and the second output latch is configured to receive a second output signal from the second nvbit.

In some aspects, the techniques described herein relate to a scan chain circuitry, wherein the shared control signal includes one or more of: a read signal, a write signal, a program signal, or an enable signal.

In some aspects, the techniques described herein relate to a bitcell for a memory device, including: a left leg, the left leg including: one or more first magnetic tunnel junctions (MTJs); one or more first write circuitries connected to the one or more first MTJs, the one or more first write circuitries configurable to execute a write operation for the one or more first MTJs based on a write control signal; and one or more first read circuitries connected to the one or more first MTJs, the one or more first read circuitries configurable to execute a read operation for the one or more first MTJs based on a read control signal; and a right leg, the right leg including: one or more second magnetic tunnel junctions (MTJs); one or more second write circuitries connected to the one or more second MTJs, the one or more second write circuitries configurable to execute a write operation for the one or more second MTJs based on the write control signal; and one or more second read circuitries connected to the one or more second MTJs, the one or more second read circuitries configurable to execute a read operation for the one or more second MTJs based on the read control signal;

In some aspects, the techniques described herein relate to a bitcell, further including one or more logic circuitries connected to the one or more first MTJs and the one or more second MTJs, the one or more logic circuitries configured to transmit voltage to the one or more first MTJs and the one or more second MTJs for the execution of the read operation or the write operation.

In some aspects, the techniques described herein relate to a bitcell, wherein the one or more first read circuitries and the one or more second read circuitries include one or more cross coupled pairs of switching transistors, the one or more cross coupled pairs of switching transistors configured to provide positive feedback of voltage between the left leg and the right leg for the execution of the read operation.

In some aspects, the techniques described herein relate to a bitcell, further including a flip-flop connected to the one or more first MTJs and the one or more second MTJs, the flip-flop configured to load a data in (din) to the one or more first MTJs and/or the one or more second MTJs based on a clock signal and the write control signal for the execution of the write operation.

In some aspects, the techniques described herein relate to a bitcell, further including an output latch connected to the one or more first read circuitries and the one or more second read circuitries, the output latch configured to receive an output signal from the one or more first MTJs and/or the one or more second MTJs based on a clock signal and the read control signal for the execution of the read operation.

In some aspects, the techniques described herein relate to a bitcell, wherein the execution of the read operation includes: comparing a logic state of the one or more first MTJs to a logic state of the one or more second MTJs to detect a difference in resistance between the one or more first MTJs and the one or more second MTJs as part of a differential read scheme; and detecting one or more stored bits in the one or more first MTJs and/or the one or more second MTJs based on the comparison.

In some aspects, the techniques described herein relate to a bitcell, further including: a pair of follower transistors connected to the one or more first MTJs and the one or more second MTJs, the pair of follower transistors configured to control a voltage level across the one or more first MTJs and/or the one or more second MTJs for the execution of the read operation.

In some aspects, the techniques described herein relate to a bitcell, wherein the pair of follower transistors include N-Channel Metal-Oxide-Semiconductor (NMOS) transistors or P-Channel Metal-Oxide-Semiconductor (PMOS) transistors.

In some aspects, the techniques described herein relate to a memory device, including: one or more magnetic tunnel junctions (MTJs) provided on a backend layer between a first metal layer and a second metal layer; one or more logic circuitries provided on the first metal layer or the second metal layer, the one or more logic circuitries configured to execute a read operation or a write operation associated with the one or more MTJs based on a control signal and a clock signal; and one or more dummy MTJs provided proximate the one or more MTJs on the backend layer, wherein a combined area footprint of the one or more MTJs is less than or equal to a combined area footprint of the one or more logic circuitries.

In some aspects, the techniques described herein relate to a memory device, wherein the one or more MTJs and the one or more logic circuitries are components of a plurality of bitcells, wherein a combined perimeter footprint of the one or more dummy MTJs is outside a combined perimeter footprint of the plurality of bitcells.

In some aspects, the techniques described herein relate to a memory device, wherein the one or more logic circuitries include a flip-flop and an output latch.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A scan chain circuitry for a memory device, comprising:
   a first non-volatile storage bit (nvbit) configured to receive a shared control signal;
   a second nvbit configured to receive the shared control signal;
   a first flip-flop connected to the first nvbit; and
   a second flip-flop connected to the second nvbit and the first flip-flop,
   wherein the first flip-flop enables loading a first data in (din) to the first nvbit based on a clock signal, and
   wherein the second flip-flop enables loading a second din to the second nvbit based on the clock signal.

2. The scan chain circuitry of claim 1, wherein loading the first din to the first nvbit and loading the second din to the second nvbit are configured to occur simultaneously.

3. The scan chain circuitry of claim 1, wherein the first flip-flop enables providing a first data out (dout) from the first nvbit based on the clock signal, and
   wherein the second flip-flop enables providing a second dout from the second nvbit based on the clock signal.

4. The scan chain circuitry of claim 1, wherein for execution of a write operation to the first nvbit:
   the first flip-flop is configured to load the first din to the first nvbit based on the clock signal; and
   the first nvbit is configured to receive a write signal as the shared control signal, wherein a logic state of the first nvbit is set based on the first din.

5. The scan chain circuitry of claim 4, wherein for execution of a write operation for the second nvbit:
   the second flip-flop is configured to load the second din to the second nvbit based on the clock signal; and
   the second nvbit is configured to receive the write signal as the shared control signal, wherein a logic state of the second nvbit is set based on the second din.

6. The scan chain circuitry of claim 1, further comprising:
   a first output latch connected to the first nvbit; and
   a second output latch connected to the second nvbit.

7. The scan chain circuitry of claim 6, wherein for execution of a read operation for the first nvbit:
   the first nvbit is configured to receive a read signal as the shared control signal; and
   the first output latch is configured to receive a first output signal from the first nvbit.

8. The scan chain circuitry of claim 7, wherein for execution of a read operation for the second nvbit:

the second nvbit is configured to receive the read signal as the shared control signal; and the second output latch is configured to receive a second output signal from the second nvbit.

9. The scan chain circuitry of claim 1, wherein the shared control signal includes one or more of: a read signal, a write signal, a program signal, or an enable signal.

* * * * *